US005479098A

United States Patent [19]
Yokoyama et al.

[11] Patent Number: 5,479,098
[45] Date of Patent: Dec. 26, 1995

[54] LOOP-BACK CIRCUIT FOR TESTING A MAGNETIC RECORDING SYSTEM WITH SIMULTANEOUS READ AND WRITE FUNCTIONS

[75] Inventors: Ray Y. Yokoyama, Santa Clara; Gerald L. Pressman, Cupertino, both of Calif.

[73] Assignee: Trace Mountain Products, Inc., San Jose, Calif.

[21] Appl. No.: 33,167

[22] Filed: Mar. 15, 1993

[51] Int. Cl.⁶ ............................ G01R 33/12; G11B 20/18; G11B 27/36
[52] U.S. Cl. .................. 324/212; 360/31; 369/53
[58] Field of Search ........................ 324/210, 211, 324/212; 360/31, 48, 53, 54; 369/53

[56] References Cited

U.S. PATENT DOCUMENTS 3,631,335  12/1971  Carr et al. ................. 324/212
4,001,673  1/1977   Barrett et al. ............. 324/210
4,321,636  3/1982   Lenz ......................... 324/210 X
4,967,155  10/1990  Magnuson ................... 324/212
5,087,884  2/1992   Brannon ..................... 324/212 X
5,130,866  7/1992   Klaassen et al. ............ 324/212 X
5,212,445  5/1993   Meyer ....................... 324/212

Primary Examiner—Sandra L. O'Shea
Assistant Examiner—Warren S. Edmonds
Attorney, Agent, or Firm—Albert C. Smith

[57] ABSTRACT

In a magnetic recording system, a loop-back test circuit provides a technique to test a magnetic recording head, a read circuit, and a write circuit to a read-write head, is sensed through the voltage generated at the head by the test current, such that a small voltage portion of the test signal is transferred through a resistor toga read circuit. The voltage portion is then filtered through a capacitor to form detectable peaks such that the read signal is generated with pulses corresponding to the peaks.

11 Claims, 4 Drawing Sheets

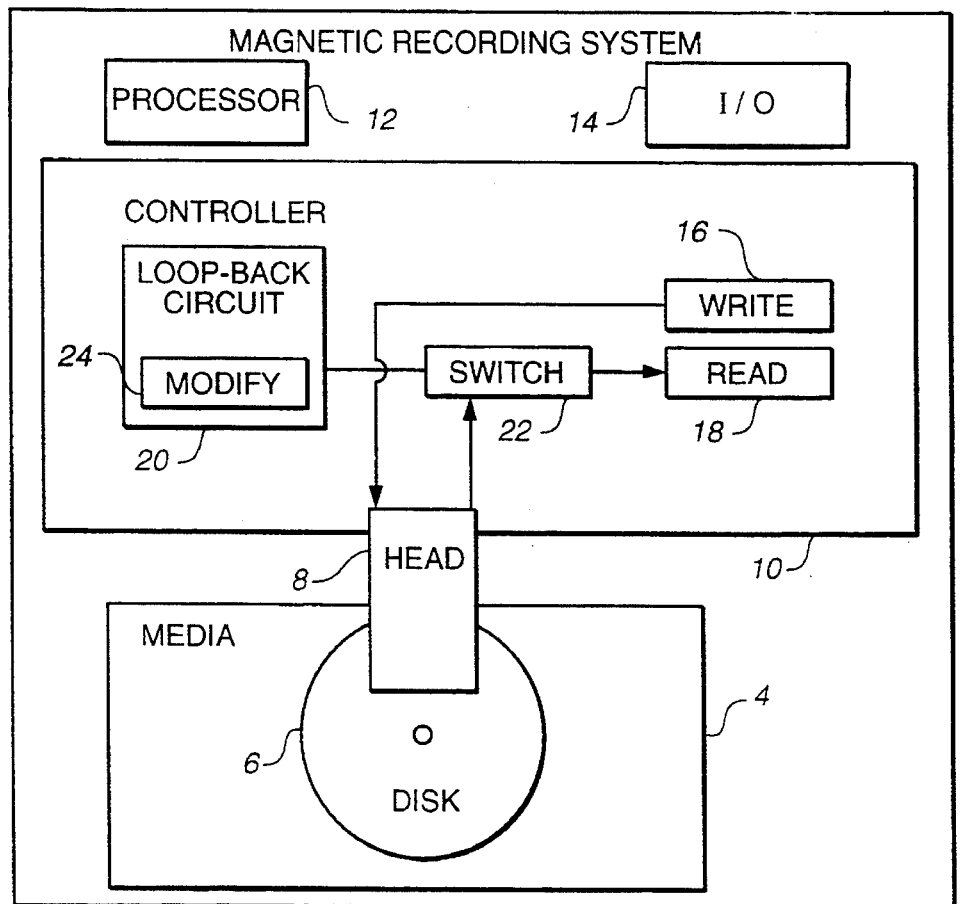
FIG._1
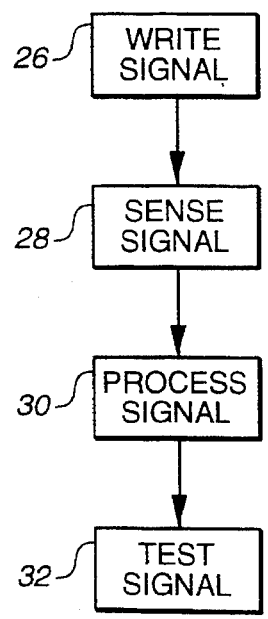
FIG._2

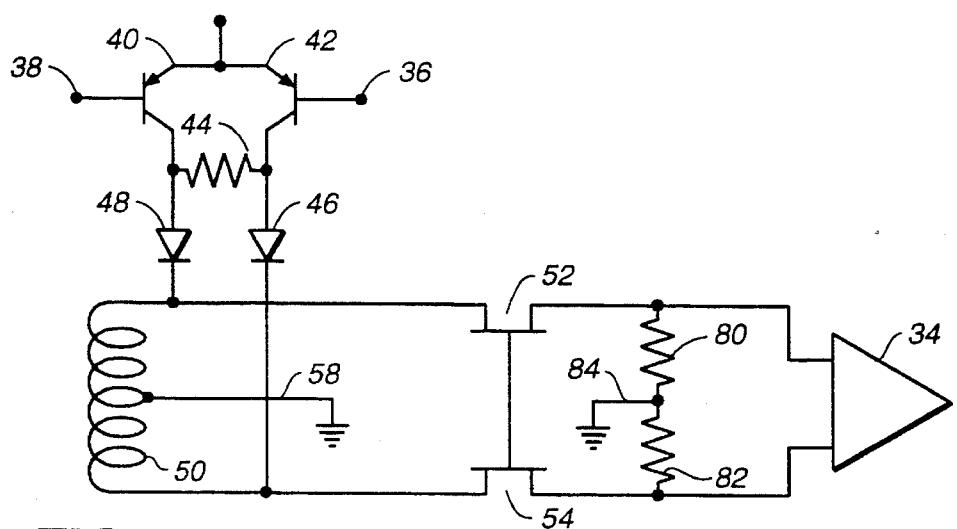
FIG._3
(PRIOR ART)
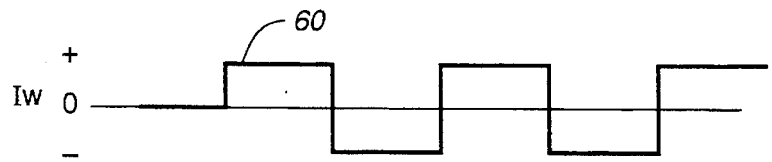
FIG._4
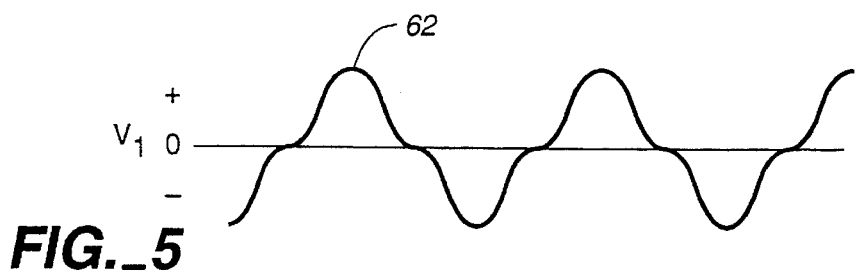
FIG._5
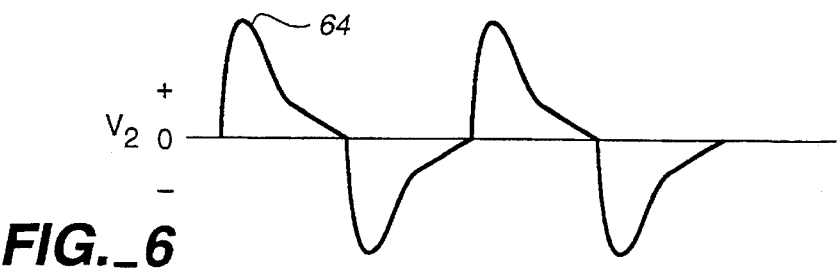
FIG._6

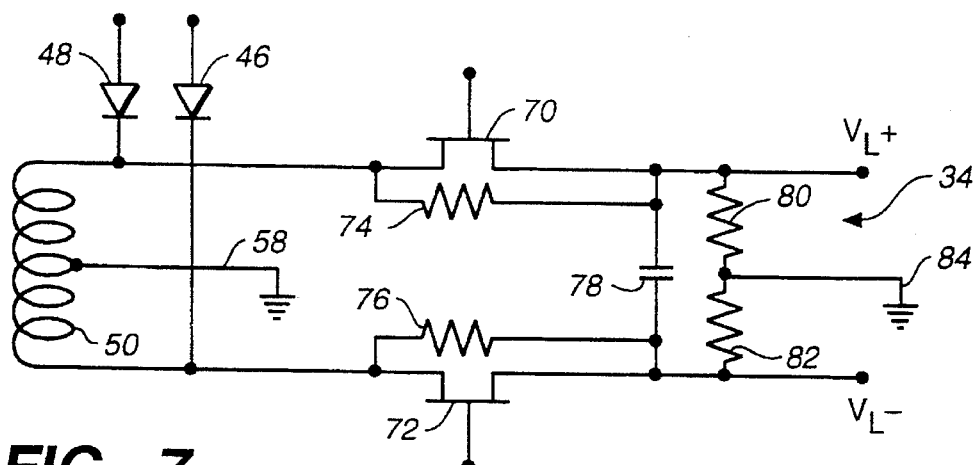
FIG._7
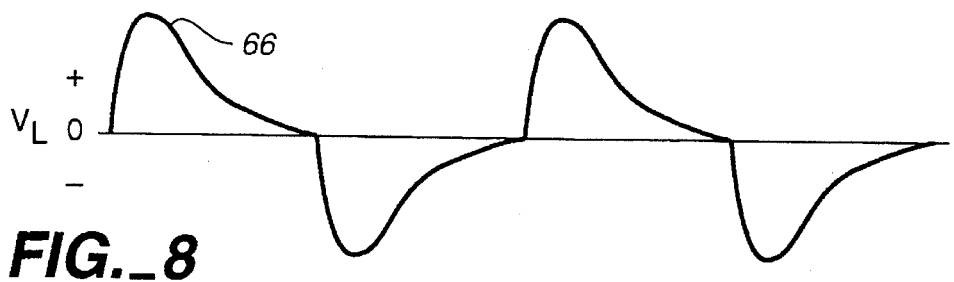
FIG._8
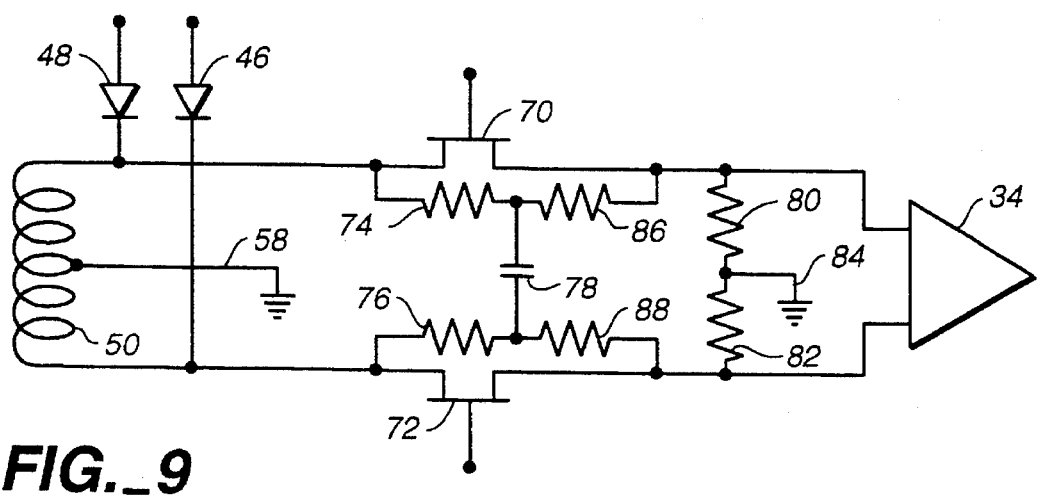
FIG._9

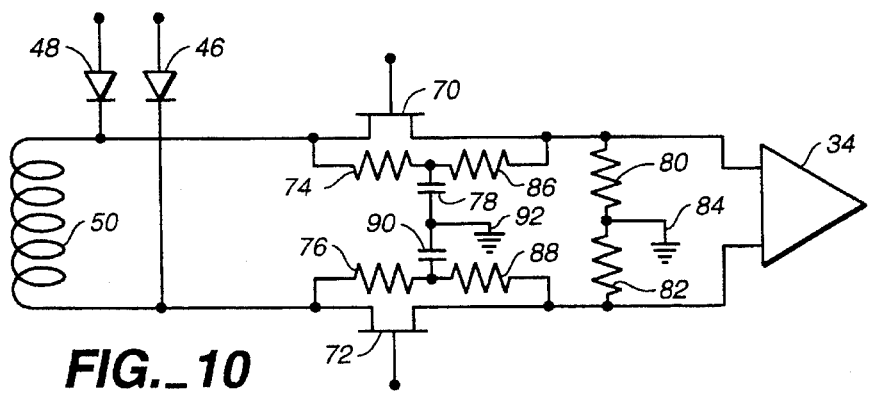
FIG._10
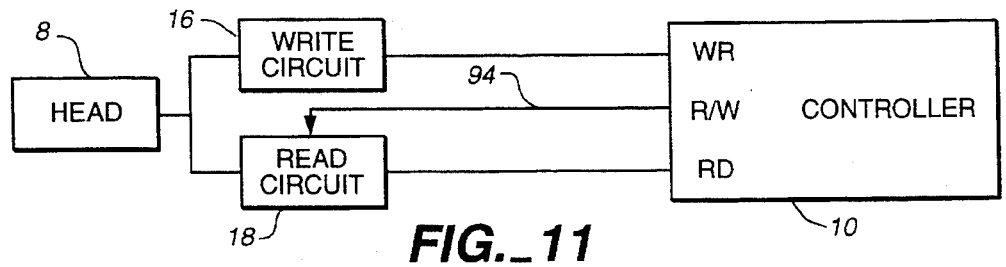
FIG._11
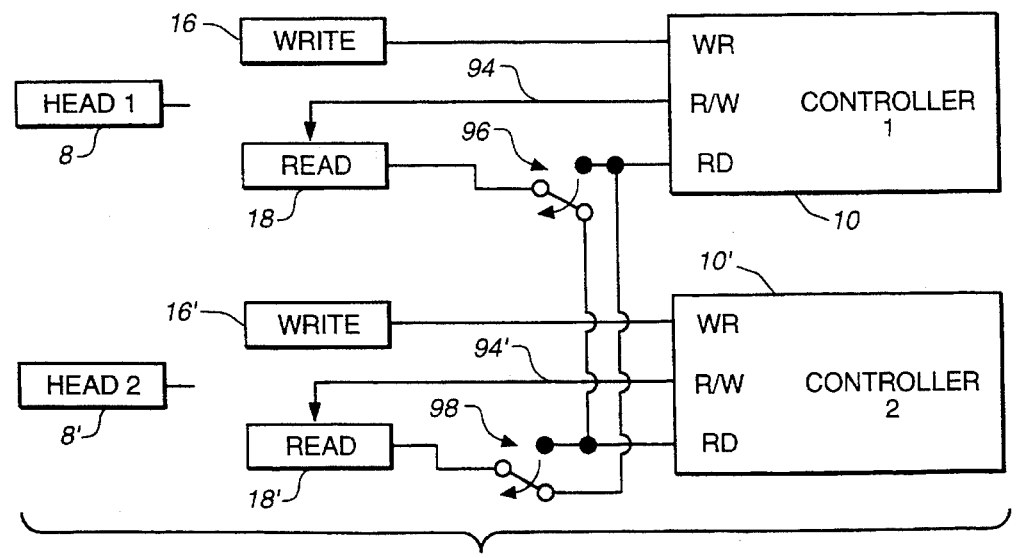
FIG._12

LOOP-BACK CIRCUIT FOR TESTING A MAGNETIC RECORDING SYSTEM WITH SIMULTANEOUS READ AND WRITE FUNCTIONS

BACKGROUND OF THE INVENTION

1. Field of the Invention

This invention relates to electronic data storage systems, particularly to circuits for testing magnetic recording systems.

2. Description of the Background Art

Systems for recording electronic signals in magnetic media perform two basic operations: writing signals to the media, and reading recorded signals from the media. In conventional recording systems, these operations are performed by separate read and write circuits.

If functional problems occur during the operation of the recording system, various tests may be performed to isolate possible problem sources, e.g., either to the magnetic media, the read circuit, or the write circuit. Because such problems often arise in the magnetic media, it is desirable to provide a circuit which initially tests the read and write circuits, thereby quickly eliminating the read and write circuits as potential problem sources.

Accordingly, test circuits, known as "loop-back" circuits, are provided for testing read and write circuits in magnetic recording systems. Generally, loop-back circuits operate by sending signals from the write circuit to the read circuit, while such circuits are disconnected from the magnetic head. In this way, the loop-back circuit may determine whether the read and write circuits are functioning correctly.

Because conventional loop-back circuits disconnect the read and write circuits from the read-write head during testing, functional problems in the head are not detectable by such loop-back circuits. Also, when used for testing recording systems known as disk-duplication systems, wherein multiple signal channels are used for reading or writing simultaneously to both sides of a magnetic disk, loop-back circuits may give rise to signal interference between such channels. This cross-coupling problem might occur, for instance, when loop-back circuits are positioned closely to sensitive read or write circuits.

Loop-back circuits have not been used widely in low-cost recording systems because loop-back circuits are relatively complex and typically require a number of components, such as switch relays and transformers, which increase the cost of each system. For example, to operate properly, each loop-back circuit must include a circuit for modifying the signal sent from the write circuit to the read circuit. The modifying circuit is needed to attenuate the write signal, which is typically several thousand times higher in amplitude than signals provided properly to the read circuit.

Moreover, in digital recording systems, the modifying circuit is needed to process write signals by simulating the signal differentiation which occurs during digital recording read-back. Thus, during write-signal processing, the modifying circuit produces a simulated differentiation of the write signal so that such simulated signal may be received properly by the read circuit.

It would be desirable, therefore, to provide an improved circuit for testing magnetic recording systems, wherein read-write head testing is enabled, and signal interference and component count are reduced.

SUMMARY OF THE INVENTION

The invention resides in transferring a portion of a voltage generated by a test write signal at a recording head to a read circuit. Peaks in the voltage portion are detected and filtered for generating a read signal having pulses corresponding to the peaks. The test signal may then be compared to the read signal.

Preferably, the portion of voltage generated by the test signal is transferred by passing such voltage portion through a resistive switch circuit to an amplifier input in the read circuit. Additionally, the test signal may be filtered by passing the signal through a capacitive circuit.

BRIEF DESCRIPTION OF THE DRAWINGS

FIG. 1 a block diagram of magnetic recording system 2 having processor 12 input/output (I/O) circuit 14, controller 10, and magnetic media 4.

FIG. 2 is a simplified flow chart of a method directed to the present invention

FIG. 3 is a circuit schematic of a prior art "head-end" portion of a magnetic recording system.

FIG. 4 is a timing diagram showing a square waveform representative of write current signal.

FIG. 5 is a timing diagram showing a typical read signal generated by the recording made with the write signal of FIG. 4.

FIG. 6 is a timing diagram showing write voltage at recording head 8.

FIG. 7 is a circuit schematic of a "head-end" portion of a magnetic recording system showing an embodiment of the present invention.

FIG. 8 is a timing diagram showing write voltage after passing through the circuit of FIG. 7.

FIG. 9 is a circuit schematic of an alternate embodiment of the present invention, including additional resistors 86, 88.

FIG. 10 is a circuit schematic of an alternate embodiment of the present invention, including grounded capacitors 78, 90.

FIG. 11 is a block diagram of an embodiment of the present invention, showing controller 10 coupled to read-write head 8 through write circuit 16 and read circuit 18.

FIG. 12 is a block diagram of an alternate embodiment of the present invention, showing dual controllers 10, 10' coupled to dual read-write heads 8, 8' respectively through dual write circuits 16, 16' and dual read circuits 18, 18'.

DESCRIPTION OF THE PREFERRED EMBODIMENT

FIG. 1 is a block diagram of magnetic recording system 2 having conventional microprocessor 12, input/output (I/O) circuit 14, and controller 10 having read-write recording head 8 coupled to magnetic media 4 including storage disk, tape, drum or other magnetic device 6. Controller 10 also includes read circuit 18, write circuit 16, and loop-back circuit 20 having modification circuit 24, preferably defined by a resistor-capacitor network. Switch circuit 22, coupled to loop-back circuit 20, may disconnect read circuit 18 from head 8.

In accordance with the present invention, when switch 22 disconnects read circuit 18 from write circuit 16 during writing, an improved loop-back circuit 20 affects testing of head circuitry 8, 16, 18 by transferring or "leaking" a relatively small voltage port,on, preferably having a voltage ratio of 1:500, of a loop-back test or write signal generated across recording head from write circuit 16 to read circuit 18. Further, the test signal may be filtered to generate a pulsed signal, as described hereunder.

FIG. 2 is a simplified flow chart of a method directed to the present invention, generally including the steps of signal writing 26, sensing 28, processing 30, and testing 32.

Initially, assuming a magnetic recording system which is functionally equivalent to system 2 of FIG. 1 is provided, a test or recording write signal is sent by write circuit 16 through magnetic recording head 8. The test signal may be any signal normally written to disk, such as a conventional square waveform.

The write signal is then accessed or sensed 28, preferably by transferring a relatively small portion of the head 8 voltage through a resistive circuit in loop-back circuit 20 coupled to an amplifier input in read circuit 18.

After the voltage portion is transferred, the accessed signal is processed 30 by loop-back circuit 20 to include at least one detectable peak. Preferably, the accessed signal is filtered to form signal peaks by passing such signal through a capacitive circuit in loop-back circuit coupled to read circuit 18. The formed peaks are then detected to generate a read or data signal having pulses which correspond to the peaks.

In order to test the functional operation of write circuit 16, read circuit 18, and read-write head 8, the generated read signal is tested 32 by comparing such generated signal to the original test signal recorded in head 8. If both signals fare essentially equivalent (i.e., all corresponding digital data pulses and peaks match,) then it is determined by loop,back circuit 20 that head circuitry 8, 16, 18 is functioning properly.

Prior art "head-end" circuitry is shown in FIG. 3. This implementation uses a single magnetic head 50 coupled 58 to ground for both reading and writing operations and may be improved by the present invention. High-level write currents are generated by transistors 40, 42, alternately, in one direction and then the other direction, through magnetic head 50, under control of write signals (+/−) 36, 38. Diodes 46, 48 prevent components of Write circuit 16, particularly write-current damping resistor 44, from affecting read signal, which is of too small a magnitude to turn on diodes 46, 48.

When write circuit 16 is active, read circuit 18, 34 is disconnected from head 50 by switches 52, 54, which are usually field-effect transistors (FET) to obtain a high degree of signal decoupling. Read circuit 18, 34 is disconnected during writing because large voltage signals present can damage sensitive input stage of read amplifier 34. Also, such high signals will saturate the entire read electronics chain, and such circuit would not recover fast enough to do common "write-then-read" data verification.

During read operations, write signals 36, 38 are absent, and switches 52, 54 are turned on so that signal picked up by head 50 is transmitted to read electronics 34. With write damping resistor 44 isolated by diodes 46, 48, read damping resistors 80, 82, which are coupled to ground 84, provide proper damping for the read function.

FIG. 4 is a timing diagram showing a square waveform representative of write current signals 36, 38, which are sent to head 50 during write operations. Such write current signals 36, 38, even when translated to voltage and diminished in amplitude, are not a suitable input signals to read circuit 18. This is because read circuit 18 of typical digital recording system 2 is designed to respond to peaks 62 of a normal read signal, as shown in FIG. 5. However, the voltage waveform at head 50 during write operation does not appear similar to write current signal 36, 38 of FIG. 4.

A typical write voltage waveform 68 at head 8 is shown in FIG. 6. Note that head 8 inductance has produced a differentiated signal 64, which is much closer in appearance to normal read signal of FIG. 5. In conventional switching loop-back circuits that use write signals isolated from the head, this signal differentiation must be achieved or simulated by various modifying circuits.

Because the write voltage waveform 64 of FIG. 6 is not correct for accurate peak detection by read circuit 18 (i.e., insofar that peaks 64 are too sharp for typical read circuits,) some "rounding off" is still required. In some embodiments the read filter circuitry, which is a normal component of read circuit 18, will provide sufficient rounding.

In accordance with the present invention, as illustrated in alternate embodiments in FIGS. 7, 9 and 10, an improved loop-back or test signal is provided by controllably transferring or "leaking" a test signal, which is a predefined portion of the head voltage, past blocking switches 70, 72. In this deliberate manner, the transferred loop-back signal is provided as input to read channel 34, whenever write circuit 16 is writing, and will appear at the output of read channel 34, which is turned on. Also, the present invention filters the loop-back signal effectively to round peaks 64.

In FIG. 7, a circuit schematic of "head-end" portion 8, 16, 18 of magnetic recording system 2 is shown. Leakage path circuitry 74, 76, 78 is shown added to conventional electronics of FIG. 3. Resistors 74, 76, which serve to bridge switches 70, 72, are selected to be of high enough value (preferably about two mega-ohms each) so that voltage appearing at input to the first read amplifier 34 is approximately the same magnitude as a normal, predefined read signal. Typically, gate terminals of switches 70, 72 are coupled together. Additional peak 64 rounding is provided by the integrating effect of capacitor 78. FIG. 8 illustrates loop-back signal voltage generated by the circuit of FIG. 7, showing the combined effect 66 of attenuation and filtration, which is a closer approximation to the typical read signal of FIG. 5. Because of the high impedance values of bypass resistors 74, 76, integrating capacitor 78 can be very small (about 20 picofarads) and therefore will not affect normal operation of read circuit 18.

An alternate embodiment of the present invention is shown in FIG. 9, wherein resistors 86, 88 are added between switches 70, 72. As before, read circuit 18, 34 functions by transmitting pulse whenever peak 66 is detected. The write-voltage waveform has very sharp peaks and must be processed to provide a reasonable read signal. Thus, in circuits where even a small amount of capacitance across read head 34 is undesireable, capacitor 78 (if used) may be isolated more effectively by the resistor-capacitor network shown in FIG. 9. In this way, resistors 86, 88 are provided with sufficiently high resistance to ensure such isolation; resistor values depend on head 8, 50 dynamic characteristics of each particular system 2.

If very high resistor 86, 88 values are required, dc isolation of capacitor 78 may become a problem due to high voltage potential gradually building-up across capacitor 78, in the absence of a ground reference for this component. Accordingly, an alternate embodiment of the present invention, as shown in FIG. 10, is provided, including grounded capacitors 78, 90. In this embodiment, capacitors 78, 90 are coupled to ground, thereby providing the same integrating effect of the circuit of FIG. 9, but capacitors 78, 90 need to be twice as large in capacitance as single capacitor 78 of FIG. 9 (i.e., assuming all other factors remain equal). It is contemplated that other resistor or capacitor network arrangements would similarly provide desired attenuation and integration.

Note that because differentiation of write current waveform is provided by head 8, 50, any defect in such head coils or magnetic material will affect the loop-back waveform, thereby likely affecting the read-data signal. Thus, this loop-back technique can detect the presence of a defective head 8, 50, unlike standard methods which switch the head out of the circuit during loop-back testing.

FIG. 11 is a block diagram showing normal operation of the present invention, wherein controller 10 is coupled to read-write head 8 through write circuit 16 and read circuit 18. Read/write signal 94 is applied by controller 10 to switches 70, 72 in read circuit 18. As described above, loop-back circuitry 20 in drive controller 10 operates in write mode by generating a write-data test signal which is written by write circuit 16 to drive head electronics 8; then, read circuit 18 reads loop-back signal to compare the read data with the write data. Any discrepancy in the data signals indicates a defective read/write circuit 16, 18 or head 8.

Because most digital drive controllers 10 cannot process read and write data signals simultaneously, loop-back techniques in such cases ale possible only if multiple read-write channels are used, such as are available from disk duplication systems. FIG. 12 shows a block diagram of yet another embodiment of the present invention, wherein dual controllers 10, 10' couple to dual read-write heads 8, 8' respectively through dual write circuits 16, 16' and dual read circuits 18, 18'.

In such multi-channel system, improved loop-back in accordance with the present invention is implemented such that a first read signal generated by a first writing channel is switched to a second, opposing channel for processing. This technique may achieved with switching circuit 22 implemented at the output of the peak detector circuit, possibly using conventional digital data switches 96, 98. It is contemplated that the present invention may be implemented using separate heads for writing and reading; in this way, additional switching at the head may be required to prevent interference between loop-back signal and the signal being generated by the recorded media.

We claim:

1. A method for testing a magnetic recording system that includes at least a read circuit, at least a write circuit, and at least a magnetic recording head, and a controller coupled to the magnetic recording system for receiving a write data, the method comprising the steps of:

generating a write signal in the write circuit in response to the write data received thereby, the write data containing a plurality of bits;

supplying the write signal to the magnetic recording head to produce a head signal;

attenuating the head signal to include a plurality of detectable peaks;

generating a read signal by transferring a portion of the head signal into the read circuit to produce a read data containing a plurality of bits corresponding to the plurality of detectable peaks;

comparing the plurality of bits in the read data to the plurality of bits in the write data to test the read circuit, the write circuit, and the magnetic recording head, to indicate proper functioning of the magnetic recording system if the plurality of bits in the write data match the plurality of bits in the read data.

2. The method for testing the magnetic recording system according to claim 1 wherein the system includes a loop-back circuit, and comprises the step of:

transferring a portion of the head signal through the loop-back circuit to produce the read data from the read circuit.

3. The method of claim 2 wherein:

the portion of the head signal is attenuated to reduce the current flow into the read circuit.

4. The method of claim 1 wherein the magnetic recording system further comprising the step of:

writing the write data to the write circuit and reading the read data from the read circuit simultaneously to operate the write circuit and the read circuit at the same time to generate the read data from the write data.

5. The method of claim 4 wherein the comparing step further comprises the step of:

generating at least one output data pulse in response to at least one input data pulse;

generating at least one output data bit in response to at least one input data bit to provide one-to-one correspondence between the at least one output data bit to the at least one input data bit.

6. The method for testing according to claim 1 including a capacitive circuit, wherein the step of attenuating the head signals includes:

filtering the head signal in the capacitive circuit to form each detectable peak.

7. A method for testing a magnetic recording device having at least a read circuit, at least a write circuit, and at least a magnetic recording head, a controller coupled to the magnetic recording head for receiving i a write data, the method comprising the steps of:

generating the write signal in the write circuit in response to a plurality of bits in a write data received thereby;

supplying the write signal to the magnetic recording head to produce a head signal;

transferring a portion of the head signal to the read circuit;

generating from the head a read signal containing a read data including a plurality of bits; and comparing the plurality of bits in the read data to the plurality of bits in the write data to test the read circuit, the write circuit, and the magnetic recording head, to indicate proper functioning of the magnetic recording system if the plurality of bits in the read data match the plurality of bits in the write data.

8. The method for testing a magnetic recording device according to claim 7 wherein the magnetic recording system further includes a resistor and a capacitor and includes the steps of:

passing a portion of the head signal through the loopback circuit resistor prior to transferring to the read circuit; and filtering the head signal by passing the head signal through the capacitor.

9. Apparatus for testing a magnetic recording system comprising:

a read circuit;

a magnetic recording head;

a write circuit coupled to the magnetic recording head for supplying a write signal in the magnetic recording as a head signal;

a loop-back circuit connected to the read circuit and the write circuit for transferring a portion of the head signal to the read circuit; and a switch connected to the write circuit and to the read circuit and to the loop-back circuit for selectively decoupling the read circuit from the write circuit, and for transferring the portion of the head signal from the write circuit to the read circuit.

10. The apparatus of claim 9 further comprising:

a capacitive circuit connected to the switch for filtering the head signal.

11. The apparatus of claim 9 wherein the loop-back circuit comprises a resistive circuit to reduce the amount of electrical current in the head signal.

* * * * *